(12) United States Patent
Stimits et al.

(10) Patent No.: US 9,051,183 B2
(45) Date of Patent: Jun. 9, 2015

(54) HYDROGEN GENERATOR HAVING REACTANT PELLET WITH CONCENTRATION GRADIENT

(75) Inventors: Jason L. Stimits, Avon, OH (US);
Guanghong Zheng, Westlake, OH (US);
Richard A. Langan, Parma, OH (US)

(73) Assignee: Intelligent Energy Inc., San Jose, CA (US)

( * ) Notice: Subject to any disclaimer, the term of this patent is extended or adjusted under 35 U.S.C. 154(b) by 200 days.

(21) Appl. No.: 13/593,568

(22) Filed: Aug. 24, 2012

(65) Prior Publication Data
US 2014/0056772 A1    Feb. 27, 2014

(51) Int. Cl.
| | |
|---|---|
| *B01J 7/00* | (2006.01) |
| *C01B 3/06* | (2006.01) |
| *B01J 35/02* | (2006.01) |
| *C09K 3/00* | (2006.01) |
| *B01J 35/00* | (2006.01) |
| *B01J 4/00* | (2006.01) |
| *B01J 7/02* | (2006.01) |
| *B01J 21/06* | (2006.01) |
| *B01J 23/06* | (2006.01) |
| *B01J 23/10* | (2006.01) |
| *B01J 23/22* | (2006.01) |
| *B01J 23/26* | (2006.01) |
| *B01J 23/34* | (2006.01) |
| *B01J 23/40* | (2006.01) |
| *B01J 23/48* | (2006.01) |
| *B01J 23/70* | (2006.01) |

(52) U.S. Cl.
CPC . *C01B 3/065* (2013.01); *B01J 7/00* (2013.01); *B01J 35/02* (2013.01); *C09K 3/00* (2013.01); *B01J 35/0006* (2013.01); *B01J 21/063* (2013.01); *B01J 23/06* (2013.01); *B01J 23/10* (2013.01); *B01J 23/22* (2013.01); *B01J 23/26* (2013.01); *B01J 23/34* (2013.01); *B01J 23/40* (2013.01); *B01J 23/48* (2013.01); *B01J 23/70* (2013.01); *B01J 4/004* (2013.01); *B01J 7/02* (2013.01); *Y02E 60/362* (2013.01)

(58) Field of Classification Search
CPC ................ B01J 7/00; B01J 35/02; C09K 3/00
USPC ............................................... 422/211; 48/61
See application file for complete search history.

(56) References Cited

U.S. PATENT DOCUMENTS

| | | | | |
|---|---|---|---|---|
| 3,732,984 | A | * | 5/1973 | Phillippi ........................ 210/289 |
| 5,387,349 | A | * | 2/1995 | Trotter et al. .................. 210/750 |
| 7,291,417 | B2 | | 11/2007 | Herman et al. |

(Continued)

FOREIGN PATENT DOCUMENTS

| | | | | |
|---|---|---|---|---|
| WO | WO 2010069319 A2 | * | 6/2010 | .............. F04B 43/00 |

*Primary Examiner* — Walter D Griffin
*Assistant Examiner* — Huy-Tram Nguyen
(74) *Attorney, Agent, or Firm* — Baker & Hostetler, LLP

(57) ABSTRACT

A hydrogen generator is provided for generating hydrogen gas for a fuel cell stack. The hydrogen generator includes a container, and a liquid reactant storage area configured to contain a liquid including a first reactant. The hydrogen generator also includes a reaction area within the container, and a solid containing a second reactant within the reaction area and having a concentration gradient that varies along an axis such as length of the solid. The hydrogen generator further includes a liquid delivery member for delivering the liquid to the solid in the reaction area to generate hydrogen. The concentration gradient controls a reaction rate of the first and second reactants.

13 Claims, 3 Drawing Sheets

(56) References Cited

U.S. PATENT DOCUMENTS

| | | |
|---|---|---|
| 7,410,567 B2 | 8/2008 | Lefenfeld et al. |
| 7,682,411 B2 | 3/2010 | Jones et al. |
| 2001/0022960 A1* | 9/2001 | Kojima et al. ............... 423/657 |
| 2003/0228252 A1* | 12/2003 | Shurtleff ..................... 423/657 |
| 2005/0036941 A1* | 2/2005 | Bae et al. ................. 423/658.2 |
| 2005/0238573 A1* | 10/2005 | Zhang et al. .............. 423/648.1 |
| 2006/0002839 A1 | 1/2006 | Lefenfeld et al. |
| 2007/0037034 A1* | 2/2007 | Fisher et al. .................. 429/34 |
| 2008/0014481 A1 | 1/2008 | Fiebig |
| 2008/0241613 A1 | 10/2008 | Kelly et al. |
| 2008/0256858 A1* | 10/2008 | Fuller et al. .................... 48/174 |
| 2009/0011294 A1* | 1/2009 | Kong .............................. 429/19 |
| 2009/0017347 A1* | 1/2009 | Damery et al. ................. 429/19 |
| 2009/0113795 A1* | 5/2009 | Eickhoff ......................... 48/116 |
| 2010/0150824 A1 | 6/2010 | Withers-Kirby et al. |
| 2010/0330452 A1* | 12/2010 | Paik et al. ..................... 429/483 |
| 2011/0020215 A1 | 1/2011 | Ryu et al. |
| 2011/0070151 A1 | 3/2011 | Braithwaite et al. |
| 2011/0200495 A1 | 8/2011 | Braithwaite |
| 2011/0263021 A1* | 10/2011 | Stobbe ......................... 435/398 |

\* cited by examiner

HYDROGEN GENERATOR HAVING REACTANT PELLET WITH CONCENTRATION GRADIENT

FIELD OF THE INVENTION

The present invention generally relates to a hydrogen generator, particularly a hydrogen generator for a fuel cell system, and a reactant pellet configured to efficiently react with a liquid reactant.

BACKGROUND OF THE INVENTION

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

Fuel cells can be categorized according to the types of materials used in the positive electrode (cathode) and negative electrode (anode) reactions. One category of fuel cell is a hydrogen fuel cell using hydrogen as the negative electrode active material and oxygen as the positive electrode active material. When such a fuel cell is discharged, hydrogen is oxidized at the negative electrode to produce hydrogen ions and electrons. The hydrogen ions pass through an electrically nonconductive, ion permeable separator and the electrons pass through an external circuit to the positive electrode, where oxygen is reduced.

In some types of hydrogen fuel cells, hydrogen is formed from a fuel supplied to the positive electrode side of the fuel cell, and hydrogen is produced from the supplied fuel. In other types of hydrogen fuel cells, hydrogen gas is supplied to the fuel cell from a source outside the fuel cell. A fuel cell system can include a fuel cell battery, including one or more fuel cells, and a hydrogen source, such as a hydrogen tank or a hydrogen generator. In some fuel cell systems, the hydrogen source can be replaced after the hydrogen is depleted. Replaceable hydrogen sources can be rechargeable or disposable.

A hydrogen generator uses one or more reactants containing hydrogen that can react to produce hydrogen gas. The reaction can be initiated in various ways, such as hydrolysis and thermolysis. For example, two reactants can produce hydrogen and byproducts when mixed together. A catalyst can be used to catalyze the reaction. When the reactants react, reaction products including hydrogen gas and byproducts are produced.

For a hydrolysis reaction, the hydrogen generator typically employs a liquid containing a first reactant that mixes with a second solid reactant within a reaction area in a container. A liquid delivery nozzle or dispersing member is typically employed to transport the liquid from a storage area to the reaction area. The liquid delivery nozzle can include a tube having one or more openings through which a liquid passes into the reaction area to mix with the second solid reactant. The reaction causes the generation of hydrogen gas, which exits the hydrogen generator and may be provided as fuel to a fuel cell battery.

It is desirable to provide an effective and efficient utilization of the solid reactant upon reaction with the liquid reactant.

SUMMARY OF THE INVENTION

The above advantages are provided by a hydrogen generator and solid reactant having a concentration gradient for use in a hydrogen generator according to the present invention.

A first aspect of the present invention is a hydrogen generator. The hydrogen generating includes a container and a liquid reactant storage area configured to contain a liquid including a first reactant. The hydrogen generator also includes a reaction area within the container. The hydrogen generator further includes a solid containing a second reactant within the reaction area and includes a concentration gradient that varies along an axis of the solid. The concentration gradient controls a reaction rate of the first and second reactants. A liquid delivery member delivers the liquid to the solid in the reaction area to generate hydrogen.

Embodiments of the first aspect of the invention can include one or more of the following features:
- the solid includes an acid having an acid concentration that varies along the axis of the solid to provide the concentration gradient;
- the solid includes a catalyst, wherein the catalyst varies along the axis of the solid to provide the concentration gradient;
- the solid includes a hydrophilic material that varies along the axis of the solid to provide the concentration gradient;
- the solid has at least one of density or porosity that varies along the axis of the solid to provide the concentration gradient;
- the liquid delivery member includes a liquid distribution portion having a plurality of liquid outlets;
- the liquid distribution portion has first and second ends, and a liquid flow outlet greater at the first end than the second end, wherein the concentration gradient has a reactant concentration that is lowest at the first end and higher at the second end;
- the solid includes a first portion having a first reactant concentration and a second portion having a second reactant concentration, and the first reactant concentration is different than the second reactant concentration;
- the first portion is closer to an inlet of the liquid delivery member and the second portion is closer to a distal outlet of the liquid delivery member;
- the solid further includes a third portion having a third reactant concentration and a fourth portion having a fourth reactant concentration;
- the axis is along a length of the solid;
- the solid is a solid body including one or more pellets;
- the second reactant includes sodium borohydride and the first reactant includes water;
- the liquid reactant storage area is contained within the container; and
- the hydrogen generator includes a hydrogen outlet for outputting the generated hydrogen.

A second aspect of the present invention is a solid including a solid reactant for use in a hydrogen generator. The solid includes a first portion extending along a first segment of a dimension of the solid and having a first solid reactant concentration. The solid further includes a second portion extending along a second segment of the dimension of the solid and having a second solid reactant concentration. The first and second solid reactant concentrations provide a concentration gradient along an axis of the solid.

Embodiments of the second aspect of the invention can include one or more of the following features:

the solid includes an acid, wherein an acid concentration in the first and second portions varies to provide the concentration gradient;

the solid includes a catalyst, wherein the catalyst in the first and second portions varies to provide the concentration gradient;

the solid includes a hydrophilic material that varies in the first and second portions to provide the concentration gradient;

the solid has at least one of density or porosity that varies in the first and second portions to provide the concentration gradient;

the solid includes a third portion extending along a third dimension and having a third solid reactant concentration, wherein the third solid reactant concentration is different than the first and second solid reactant concentrations;

the solid includes a fourth portion extending along a fourth dimension and having a fourth solid reactant concentration, wherein the fourth solid reactant concentration is different from the first, second and third solid reactant concentrations;

the dimension is a length;

the solid is a solid body including one or more pellets; and the solid reactant includes sodium borohydride.

A further aspect of the invention is a method of generating gas with a hydrogen generator using solid body having a solid reactant concentration gradient. The method includes forming a solid body containing a solid reactant and having a solid reactant concentration gradient that varies along an axis of the solid reactant. The method also includes delivering a liquid reactant to the solid reactant with a liquid delivery member to generate hydrogen, wherein the solid reactant concentration gradient controls a reaction rate of the solid and liquid reactants. The method further includes outputting the hydrogen gas.

These and other features, advantages and objects of the present invention will be further understood and appreciated by those skilled in the art by reference to the following specification, claims and appended drawings.

Unless otherwise specified, the following definitions and methods are used herein:

"effluent" means non-gaseous reaction products and unreacted reactants, solvents and additives;

"expand" when used in describing a filter means for the filter material to simultaneously increase in volume, increase in porosity and decrease in density and pertains only to the material of which the filter is made;

"initial" means the condition of a hydrogen generator in an unused or fresh (e.g., refilled) state, before initiating a reaction to generate hydrogen;

"volume exchanging relationship" means a relationship between two or more areas or containers within a hydrogen generator such that a quantity of volume lost by one or more of the areas or containers is simultaneously gained by one or more of the other areas or containers; the volume thus exchanged is not necessarily the same physical space, so volume lost in one place can be gained in another place;

"concentration gradient" means a change in the concentration of a substance from one region of a solid to another region of the solid along an axis of the solid; and "reactant concentration" means the concentration of a reactant or substance that affects the rate of reaction of the solid reactant.

Unless otherwise specified herein, all disclosed characteristics and ranges are as determined at room temperature (20-25° C.).

These and other advantages of the invention will be further understood and appreciated by those skilled in the art by reference to the following written specification, claims, and appended drawings.

DETAILED DESCRIPTION

Figure 1:
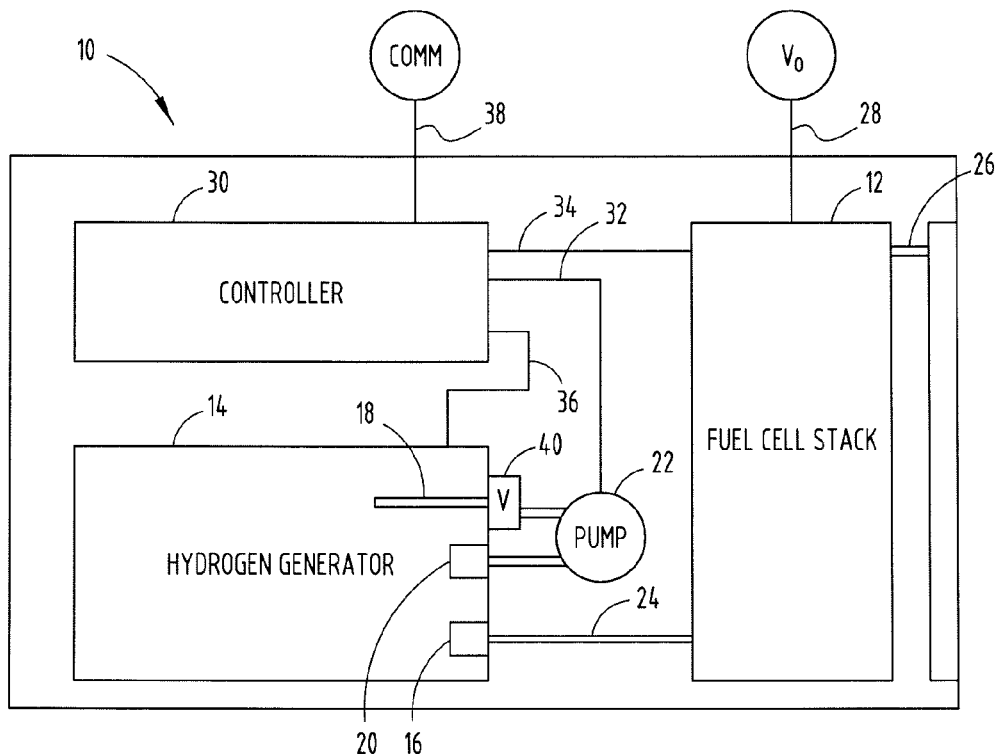
FIG. 1 is a schematic diagram of a fuel cell system including a hydrogen generator, according to one embodiment.

The present invention includes a separate hydrogen gas generator that can be incorporated into a fuel cell system including a fuel cell battery, but it is not part of the fuel cell itself It is typically a removable, replaceable or refillable unit that can supply hydrogen to a fuel cell, rather than supplying a liquid or other fluid that is reformed by or within the fuel cell to produce hydrogen gas or protons.

The fuel cell with which the hydrogen generator can be used can be a battery containing a single fuel cell, or it can be a battery containing a plurality of fuel cells (sometimes referred to as a fuel cell stack). The fuel cell can be any type of fuel cell that uses hydrogen as a fuel. Examples include proton exchange membrane fuel cells, alkaline fuel cells and solid oxide fuel cells.

In one embodiment, a hydrogen generator includes a container with one or more reactant storage areas, a reaction area and an effluent storage area within the container. One or more reactant-containing liquids, each containing one or more reactants, are transferred from the reactant storage area or areas to the reaction area, where the reactant or reactants react to produce hydrogen gas and byproducts. One or more reactants can also be initially contained within the reaction area. The reaction can be catalyzed by a catalyst, which can be initially in the reaction area or contained in a fluid transferred to the reaction area. The byproducts can include gaseous, liquid and solid reaction products. The production of hydrogen gas can force effluent from the reaction area, through an effluent passage, to the effluent storage area. The effluent can include reaction byproducts as well as unreacted reactants and additives.

The reactant-containing liquid includes a first reactant, which can be the liquid (e.g., water), or the reactant can be mixed, suspended, dissolved or otherwise contained in the liquid. After the liquid is transported from the reactant storage area to the reaction area, it reacts with a second reactant to produce hydrogen gas. In one embodiment, one reactant is contained in the reaction area, preferably in a solid form as one or more pellets, and the reactant-containing liquid is transported from the reactant storage area to the reaction area, where the reactants react to produce hydrogen gas; the reaction may be catalyzed by a catalyst in the reaction area.

The reactant storage, reaction, and effluent storage areas may be arranged in a volume exchanging configuration such that, as reactants are consumed during operation of the hydrogen generator, the effluent storage area simultaneously increases in volume by moving into space made available by a reduction in volume of the areas initially containing reactant to accommodate the effluent within the effluent storage area. In this way the total volume of the hydrogen generator can be minimized, since the amount of initial void volume within the hydrogen generator can be kept at a minimum (though some initial void volume may be necessary, if the solid and liquid reaction products have a greater volume than the initial total volume of the reactants for example). Any suitable volume exchanging configuration can be used. For example, one or more areas containing reactant (e.g., a reactant storage area and/or a reaction area containing a reactant) can be adjacent to the effluent storage area, or the effluent storage area can be separated from the areas containing reactant by one or more other components of the hydrogen generator that can move or otherwise allow the volume exchange.

Hydrogen gas is separated from the liquid and solid effluent and is released through a hydrogen outlet to an apparatus such as a fuel cell as needed. A filter and a hydrogen permeable, liquid impermeable component can be used to separate the hydrogen. The filter removes solids and may remove liquids as well, and the hydrogen permeable, liquid impermeable component removes liquids and any remaining solids, allowing only gas to pass through the hydrogen outlet. Optionally, other components may be included within or downstream from the hydrogen generator to remove other gases and impurities from the hydrogen flow.

Any or all of the reactant storage area(s), the reaction area, and the effluent storage area can be defined by one or more of the internal surfaces of the container and other components of the hydrogen generator, or one or more of these areas can be enclosed by an enclosure, such as a reactant storage enclosure, a reaction area enclosure or an effluent storage area enclosure. Such enclosures are able to undergo a change in shape (e.g., by being flexible) so their internal volume can decrease or increase as material exits or enters the enclosure. An enclosure can include a structure such as a bag, a balloon or a bellows, for example. The walls of an enclosure can be pleated or made from an elastomeric material that can stretch or contract, for example, to enable a change in internal volume. In one embodiment, an enclosure can have a wall or a portion of a wall that can stretch to provide a larger internal volume and can apply a force to the contents to facilitate emptying the contents.

In one embodiment, the effluent storage area is enclosed by an enclosure. One or more filter components can be fastened to the enclosure in one or more places to minimize the amount of effluent that can flow around the filter component. The enclosure can be or can include a hydrogen permeable, liquid impermeable material to separate hydrogen gas from liquids in the effluent storage area.

A liquid including a reactant can be transported from the reactant storage area by any suitable means. For example, the liquid can be wicked, pumped, expelled by applying a force on the liquid, or a combination thereof. If the liquid is pumped, the pump can be within or outside the hydrogen generator. The pump can be powered by a fuel cell, a battery within the hydrogen generator, or an external power source. A force can be applied directly against a reactant storage area enclosure, against a moveable partition in contact with either enclosure, or against one or more other components that make contact with or are a part of the enclosure (such as a valve assembly) for example. Force can be provided in various ways, such as with a spring, an elastic reactant storage enclosure that is initially stretched when full, wrapping the reactant storage enclosure with an elastic member, air or gas pressure on or within the reactant storage enclosure, the expansion of the filter in the effluent storage area, or a combination thereof.

The hydrogen generator includes a liquid delivery member that extends into the reaction area and is configured to deliver the liquid from the first reactant storage area to the reaction area. The liquid delivery member includes a liquid distribution portion through which the liquid including the first reactant can pass. In various embodiments the liquid distribution portion can include holes or slits through which the liquid can exit, or it can be made from a material through which the liquid can permeate or wick. These properties limit the selection of types of materials that can be used. In one embodiment, the liquid distribution portion can include a tube with holes or slits which form openings therein through which the liquid can exit. In another embodiment the liquid distribution portion can include a porous material through which the liquid can permeate. In another embodiment the liquid distribution portion can include a material through which the liquid can wick. In yet another embodiment a sleeve of wicking material is provided around the liquid distribution member. This can keep solid reaction byproducts from forming on the liquid distribution member and clogging the holes, slits, pores, etc., and preventing the flow of liquid.

The liquid delivery member may be integrally assembled to an exhaust nozzle which has an opening for allowing hydrogen gas and effluent byproduct to exit the reaction area. The liquid delivery member may include a tube that extends through or is otherwise assembled to the exhaust nozzle. The tube may be cylindrical or somewhat flattened or any other feasible shape. The liquid delivery member may include a liquid distribution portion made of plastic material or non-wettable fibers that are liquid impermeable. The liquid exits the liquid distribution portion at each of the plurality of openings. A wicking member such as a sponge like material may further be provided in fluid communication with the openings to wick the liquid to the underlying solid reactant. The general shape of the delivery member may be linear, bent or any desired shaped suitable to apply sufficient liquid to the adjacent solid. The liquid delivery member may be assembled separate from the exhaust nozzle according to another embodiment.

The liquid delivery member may be configured in various shapes and sizes to achieve a desired liquid-to-solid reactant contact time and area. The liquid-to-solid reactant contact surface may be increased by increasing the overall length or the width of the liquid distribution member. The length may be increased by using a non-linear tube such as a wrap around design or shaping the tube with undulations or multiple tubes.

The hydrogen generator includes a solid (e.g., a solid body or a solid mass including powders, granules, etc.) having a second reactant (solid reactant) within the reaction zone. As used below, "pellet" refers to a mass of any suitable shape or size into which a solid reactant and other solid ingredients are formed. The solid has a concentration gradient that varies along an axis of the pellet. The axis may be a dimension such as length of the solid such that the concentration gradient varies along the length of the solid according to the embodiment shown in FIGS. 3 and 4. In other embodiments, the axis may be along another dimension such as width or height of the pellet or another direction and concentration gradients can vary along more than one axis of the pellet. The concentration gradient controls a reaction rate of the first and second reactants. Often the liquid delivery member delivers a greater flow of liquid through the opening(s) closest to the liquid inlet side (the proximal end) as opposed to the flow of liquid through the opening(s) at the opposite distal end. As a result, it is generally difficult across longer pellets to maintain equal liquid flow from one end of the pellet to the opposite end of the pellet using a single liquid delivery member that extends along the length of the pellet, due to the variation in liquid flow rate and relatively long geometry. It is also typical to experience non-uniform reaction and pellet disintegration of the solid along the length of the pellet which generally leads to loss of reaction surface area and earlier reduction in hydrogen flow. It would be advantageous to react the second reactant uniformly to maintain reaction surface area, maintain more consistent reaction product characteristics, and maintain a stable pellet assembly. For these reasons, the solid including the second reactant has a concentration gradient that varies along an axis of the solid and the concentration gradient controls the reaction rate of the first and second reactants. Where the liquid delivery member has first and second ends and a liquid flow output greater at the first end than the second end, the concentration gradient is preferably lowest at the first end and higher at the second end. As a result, a more uniform reaction and pellet consumption is achieved.

In one embodiment, the solid has a composition that includes an acid and has an acid concentration that varies along an axis such as length to provide the concentration gradient. The presence of acid can accelerate the reaction between the solid and liquid reactants, e.g., by dissolving in and lowering the pH of the liquid. The concentration of the acid in the solid may determine how quickly the first and second reactants react to release hydrogen in the presence of the given amount of liquid. By first characterizing the gradient of liquid flow rate, from the inlet section of the liquid delivery member to the opposite end of the liquid delivery member at various hydrogen flow rate requirements, the acid concentration from one end of the pellet to the other can be adjusted as a gradient to effectively account for the differing liquid reactant flow rates across the length of the liquid delivery member. Higher acid concentrations could be used in portions of the solid where there is less liquid reactant flow, and less acid can be used in portions of the solid where there is more liquid reactant flow. As a consequence, greater consumption of the solid pellet and its second reactant may be maintained to ultimately achieve high hydrogen flow rates for longer periods of time without having to tightly control liquid flow across the entire length of the solid surface. Similarly, the acid concentration can be adjusted to compensate for the presence of more unreacted liquid in the portion of the reaction area near where the effluent exits.

For a solid reactant such as sodium borohydride which has a higher rate of reaction at lower pH or in the presence of a catalyst, acid may be an additive that reduces the pH of the reaction solution. The acid may include a malic acid provided in different concentration levels within different regions of the solid, according to one embodiment. According to other embodiments, the acid may include one or more of citric acid, carbonic acid, malic acid, phosphoric acid, boric acid, succinic acid, sulfonic acid, and oxalic acid. The acid may vary in acidity from one portion of the pellet to another portion. The change in acid throughout a path such as the length of the solid may be a continuous change or may be distinct changes in different portions of the solid. According to another embodiment, the type of acid employed in each portion of the pellet may be different to achieve different hydrogen release rates within each portion when the liquid first reactant is applied. It should further be appreciated that a base solution may be applied to one or more regions of the solid to increase the pH and thus provide a differing amount of acidity to different regions of the solid.

According to another embodiment, the concentration gradient provided in the second reactant may be provided by employing different catalysts in different portions of the solid reactant. The catalyst may include one or more transition metals from Group VIII such as iron, cobalt, nickel, ruthenium, rhodium, palladium, osmium, iridium and platinum, Group 1B such as copper, silver and gold, and Group IIB such as zinc, cadmium, and mercury of the Periodic Table of the Elements, as well as other transition metals including scandium, titanium, vanadium, chromium, and manganese. Suitable catalysts also include metal salts, such as chlorides, oxides, nitrates, and acetates.

The type and/or amount of catalyst employed in each portion of the solid may determine how quickly the solid reactant releases hydrogen in the presence of a given amount of liquid reactant. The catalyst within each section extending along an axis such as a length of the solid can be adjusted to a gradient to effectively account for the differing liquid reactant flow rates across the length of the pellet and the delivery of liquid reactant thereto. A higher concentration of catalyst may be used where there is less liquid reactant flow and less catalyst can be used where there is more liquid reactant flow. As a result, a greater consumption of the pellet and the solid reactant may be maintained to ultimately achieve high hydrogen flow rates for longer periods of time without having to tightly control liquid flow across the entire length of the solid surface. The selection of different catalysts or concentrations of one or more catalysts may be employed having different catalytic activities.

According to a further embodiment, the solid may include a hydrophilic material that varies so as to provide the concentration gradient. The hydrophilic material may include one or more of cotton, polyester, nylon, cellulose, carboxymethylcellulose, acrylic acids, and sodium polyacrylate. The hydrophilic material employed in each region of the solid may vary based on the rate at which it absorbs or wicks water. A hydrophilic material having a higher affinity for water could be used where there is less liquid (e.g., water) flow and a lower affinity for water used when there is more water flow. The type and/or amount of hydrophilic material may be different in each region of the solid to achieve the concentration gradient. As a consequence, greater consumption of the pellets and the solid reactant may be maintained more uniformly across the pellet.

According to yet another embodiment, the solid may include at least one of density and porosity of the solid that varies to provide the concentration gradient. The solid containing the second reactant may have a density or pososity that is greater in one portion compared to the other portions. The density or porosity may vary continuously from one portion to another or may include distinct changes in density or porosity extending from one end of the pellet to the opposite end. The density or porosity of the solid may be higher in regions of the solid where there is higher liquid reactant flow as compared to regions of the solid having less liquid reactant flow. Porous fibers such as polyvinyl alcohol and rayon can be employed in the solid to achieve a desired density or porosity. As a consequence, greater and more unifoim consumption of the pellet and its solid reactant may be realized.

In yet another embodiment, the solid includes another constituent, such as a binder, that varies to provide the concentration gradient. In this embodiment and the embodiments described above, a concentration gradient of the solid reactant can also accompany the concentration gradient of one or more other constituents of the solid.

Regardless of how the concentration gradient is produced, the change in concentration can be continuous within the solid, incremental within the solid from one portion (or individual pellet) to the next, or a combination of an incremental change from one portion to the next and a continuous change within one or more portions.

In one embodiment, the solid reactant includes four distinct portions including a first portion extending along a first length and having a first reactant concentration, a second portion extending along a second length and having a second reactant concentration, a third portion extending along a third length and having a third reactant concentration, and a fourth portion extending along a fourth length and having a fourth reactant concentration. The first, second, third and fourth reactant concentrations are of differing amounts so as to provide the concentration gradient from one end of the solid reactant extending the length to the opposite end. It should be appreciated that a plurality of differing solid reactant concentrations may be employed in any number of regions of two or more and that the variation in concentration gradient may vary continuously or with distinct changes in portions of the pellet. The regions may extend in other directions such as width or depth or other paths.

The generation of hydrogen gas can be controlled so hydrogen is produced as needed. Control can be based on one or more criteria, such as: pressure (e.g., internal pressure or a differential between an internal and an external pressure); temperature (e.g., hydrogen generator, fuel cell or device temperature); a fuel cell electrical condition (e.g., voltage, current or power); or a device criterion (e.g., internal battery condition, power input, or operating mode).

The hydrogen generator system can use a variety of reactants that can react to produce hydrogen gas. Examples include chemical hydrides, alkali metal silicides, metal/silica gels, water, alcohols, dilute acids and organic fuels (e.g., N-ethylcarbazole and perhydrofluorene). At least one reactant is included in the liquid stored in the reactant storage area. The liquid can be a reactant or can contain a reactant (e.g., dissolved, dispersed or suspended therein).

As used herein, the term "chemical hydride" is broadly intended to be any hydride capable of reacting with a liquid to produce hydrogen. Examples of chemical hydrides that are suitable for use in the hydrogen generator described herein include, but are not limited to, hydrides of elements of Groups 1-4 (International Union of Pure and Applied Chemistry (IUPAC) designation) of the Periodic Table and mixtures thereof, such as alkaline or alkali metal hydrides, or mixtures thereof. Specific examples of chemical hydrides include lithium hydride, lithium aluminum hydride, lithium borohydride, sodium hydride, sodium borohydride, potassium hydride, potassium borohydride, magnesium hydride, calcium hydride, and salts and/or derivatives thereof. In an embodiment, a chemical hydride such as sodium borohydride can react with water to produce hydrogen gas and a byproduct such as a borate. This can be in the presence of a catalyst, heat, a dilute acid or a combination thereof.

Chemical hydrides can react with water to produce hydrogen gas and oxides, hydroxides and/or hydrates as byproducts. The hydrolysis reaction may require a catalyst or some other means of initiation, such as a pH adjustment or heating. Chemical hydrides that are soluble in water can be included in the liquid reactant composition, particularly at alkaline pH to make the liquid sufficiently stable. The reaction can be initiated by contacting the chemical hydride solution with a catalyst, lowering the pH (e.g., with an acid), and/or heating. Chemical hydrides can be stored as a solid, and water can be added. A catalyst or acid can be included in the solid or liquid composition.

An alkali metal silicide is the product of mixing an alkali metal with silicon in an inert atmosphere and heating the resulting mixture to a temperature of below about 475° C., wherein the alkali metal silicide composition does not react with dry $O_2$. Such alkali metal silicides are described in U.S. Patent Application Publication No. 2006/0002839. While any alkali metal, including sodium, potassium, cesium and rubidium may be used, it is preferred that the alkali metal used in the alkali metal silicide composition be either sodium or potassium. Metal silicides including a Group 2 metal (beryllium, magnesium, calcium, strontium, barium and radium) may also be suitable. In an embodiment, sodium silicide can react with water to produce hydrogen gas and sodium silicate, which is soluble in water.

A metal/silica gel includes a Group 1 metal/silica gel composition. The composition has one or more Group 1 metals or alloys absorbed into the silica gel pores. The Group 1 metals include sodium, potassium, rubidium, cesium and alloys of two or more Group 1 metals. The Group 1 metal/silica gel composition does not react with dry $O_2$. Such Group 1 metal/silica gel compositions are described in U.S. Pat. No. 7,410,567 B2 and can react rapidly with water to produce hydrogen gas. A Group 2 metal/silica gel composition, including one or more of the Group 2 metals (beryllium, magnesium, calcium, strontium, barium and radium) may also be suitable.

One or more catalysts can be used to catalyze the hydrogen producing reactions. Examples of suitable catalysts include transition metals from Groups 8 to 12 of the Periodic Table of the Elements, as well as other transition metals including scandium, titanium, vanadium, chromium and manganese. Metal salts, such as chlorides, oxides, nitrates and acetates can also be suitable catalysts.

The rate of hydrogen generation can be controlled in a variety of ways, such as controlling of the rate at which liquid is transported to the reaction area, adjusting the pH, and making temperature adjustments. The rate of hydrogen generation can be controlled to match the need for hydrogen gas. A control system can be used for this purpose, and the control system can be within or at least partially outside the hydrogen generator.

Additives can be used for various purposes. For example, additives can be included with a solid reactant as a binder to hold the solid material in a desired shape or as a lubricant to facilitate the process of forming the desired shape. Other additives can be included in the liquid or the solid composition to control pH, to provide stability during storage and periods of nonuse, and to control the rate of reaction for example. Such additives include but are not limited to acids (e.g., citric, carbonic, malic, phosphoric and acetic acids or combinations thereof), or basic compounds. Additives such as alcohols and polyethylene glycol based compounds can be used to prevent freezing of the liquid. Additives such as surfactants or wetting agents can be used to control the liquid surface tension and reaction product viscosity to facilitate the flow of hydrogen gas and/or effluents. Additives such as porous fibers (e.g., polyvinyl alcohol and rayon) can help maintain the porosity of a solid reactant component and facilitate even distribution of the reactant containing liquid and/or the flow of hydrogen and effluents.

In one embodiment, water is a first reactant and a chemical hydride such as sodium borohydride (SBH) is a second reactant. The SBH can be stored as a solid in the reaction area. It can be present as a powder or formed into a desired shape. If an increased rate of reaction between the SBH and the water is desired, a solid acid, such as malic acid, can be mixed with the solid SBH, or acid can be added to the water. Solid (e.g. powdered) SBH can be formed into a solid mass, such as a block, tablet or pellet, to reduce the amount of unreacted SBH contained in the effluent that exits the reaction area. The pellet should be shaped so that it will provide a large contact surface area between the solid and liquid reactants.

In an example, a mixture including about 50 to 65 weight percent SBH, about 30 to 40 weight percent malic acid and about 1 to 5 weight percent polyethylene glycol can be pressed into a pellet. Optionally, up to about 3 weight percent surfactant (anti-foaming agent), up to about 3 weight percent silica (anti-caking agent) and/or up to about 3 weight percent powder processing rheology aids can be included in a pellet. The density of the pellet can be adjusted, depending in part on the desired volume of hydrogen and the maximum rate at which hydrogen is to be produced. A high density is desired to produce a large amount of hydrogen from a given volume. On the other hand, if the pellet is too porous, unreacted SBH can more easily break away and be flushed from the reaction area as part of the effluent. One or more pellets of this solid reactant composition can be used in the hydrogen generator, depending on the desired volume of hydrogen to be produced by the hydrogen generator. The ratio of water to SBH in the hydrogen generator can be varied, based in part on the desired amount of hydrogen and the desired rate of hydrogen production. If the ratio is too low, the SBH utilization can be too low, and if the ratio is too high, the amount of hydrogen produced can be too low because there is insufficient volume available in the hydrogen generator for the amount of SBH that is needed. In another example, a liquid including water is moved from the reactant storage area to the reaction area to react with solid sodium borohydride (SBH). The liquid includes an acid such as malic acid to provide a low pH to produce hydrogen gas at a desirable rate.

The hydrogen generator can include other components, such as control system components for controlling the rate of hydrogen generation (e.g., pressure and temperature monitoring components, valves, timers, etc.), safety components such as pressure relief vents, thermal management components, electronic components, and so on. Some components used in the operation of the hydrogen generator can be located externally rather than being part of the hydrogen generator itself, making more space available within the hydrogen generator and reducing the cost by allowing the same components to be reused even though the hydrogen generator is replaced.

The hydrogen generator can be disposable or refillable. For a refillable hydrogen generator, reactant filling ports can be included in the housing, or fresh reactants can be loaded by opening the housing and replacing containers of reactants. If an external pump is used to pump fluid reactant composition from the reaction storage area to the reactant area, an external connection that functions as a fluid reactant composition outlet to the pump can also be used to refill the hydrogen generator with fresh liquid reactant composition. Filling ports can also be advantageous when assembling a new hydrogen generator, whether it is disposable or refillable. If the hydrogen generator is disposable, it can be advantageous to dispose of components with life expectancies greater than that of the hydrogen generator externally, such as in the fuel cell system or an electrical appliance, especially when those components are expensive.

The reactant storage area, reaction area, and effluent storage area can be arranged in many different ways, as long as effluent storage area is in a volume exchanging relationship with one or more of the reactant storage and reaction areas that will allow the initially compressed filter to expand as the effluent storage area increases in volume. Other considerations in selecting an arrangement include thermal management (adequate heat for the desired reaction rate and dissipation of heat generated by the reactions), the desired locations of external connections (e.g., for hydrogen gas, liquid reactant flow to and from an external pump), any necessary electrical connections (e.g., for pressure and temperature monitoring and control of liquid flow rate), and ease of assembly.

Referring to FIG. 1, a fuel cell system 10 is illustrated containing a hydrogen generator 14, according to one embodiment. Fuel cell system 10 includes a fuel cell stack 12 and a removable hydrogen generator 14 for providing hydrogen gas fuel to the fuel cell stack 12. The hydrogen passes through an outlet valve 16 in the hydrogen generator 14, and through an inlet 24 to the fuel cell stack 12, where it is used as a fuel by the anode. Another gas, such as oxygen, enters the fuel cell stack 12 through an inlet 26, where it is used as oxidant by the cathode. The fuel cell stack 12 produces electricity shown as voltage $V_O$ that is provided to an electric device through a power output 28. Reactants within the hydrogen generator 14 react to produce the hydrogen. A liquid in the hydrogen generator 14 is transferred from a reactant storage area to a reaction area where the hydrogen is generated. The liquid is transferred by a pump 22, which can be disposed within or outside the housing of hydrogen generator 14. If the pump 22 is within the housing of the hydrogen generator 14, fewer external connections are needed, but if the pump 22 is an external pump, it can continue to be used after the used hydrogen generator 14 is replaced. In the embodiment shown, the pump 22 is shown outside the hydrogen generator 14. The liquid can be pumped out of the hydrogen generator 14 through an outlet valve 40 and back into the hydrogen generator 14 through an inlet 20. The liquid can be a reactant-containing liquid received via liquid outlet passage 18 for producing hydrogen within the hydrogen generator 14. Outlet valve 40 may be controlled to select the quantity of reactant-containing liquid pumped into the hydrogen generator 14 at a given time.

The fuel cell system 10 can include an optional control system for controlling the operation of the hydrogen generator 14 and/or the fuel cell stack 12. Components of the control system can be disposed in the hydrogen generator 14, the fuel cell stack 12, the apparatus powered by the fuel cell system, or a combination thereof. The control system can include a controller 30. Although the controller 30 can be located within the fuel cell system 10 as shown, it can be located elsewhere in the fuel cell system 10 or within the electric device for example. The controller 30 can communicate through a communication line 32 with the pump 22, through a communication line 34 with the fuel cell stack 12, through a communication line 36 with the hydrogen generator 14 and valve 40, and through a communication line 38 with the electric device. Sensors for monitoring voltage, current, temperature, pressure and other parameters can be disposed in or in communication with those components so gas generation can be controlled based on those parameters.

Figure 2:
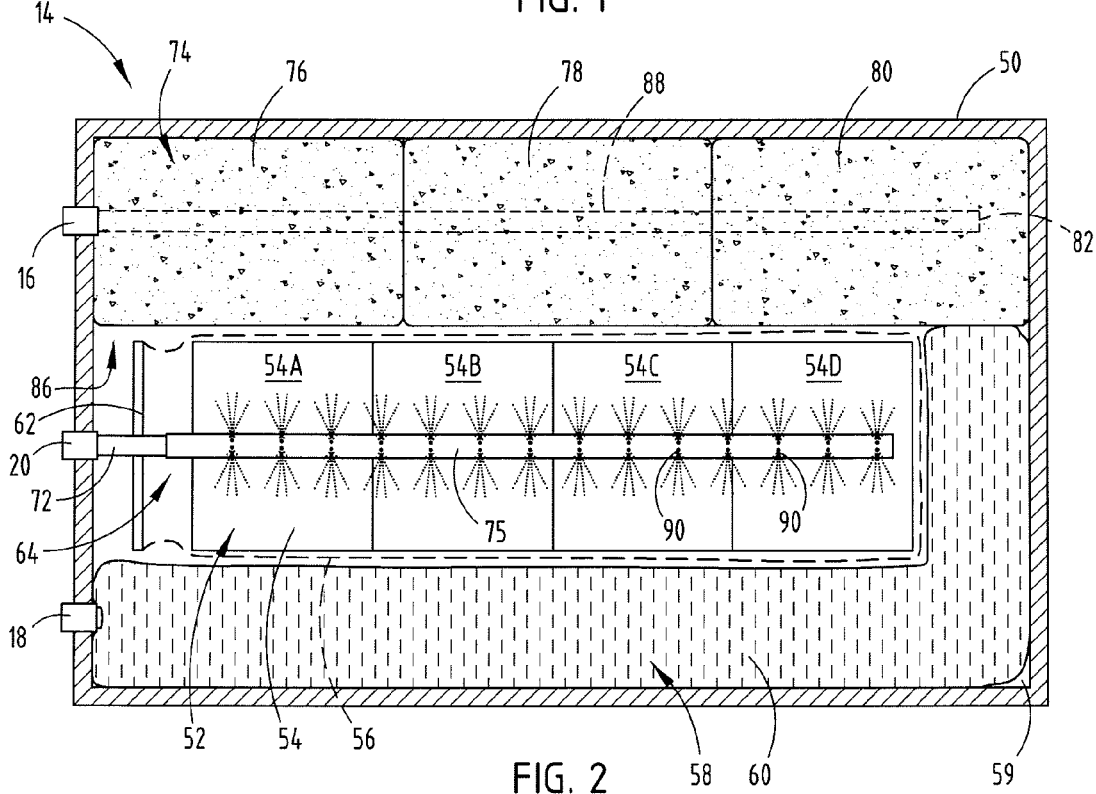
FIG. 2 is a cross-sectional view of the hydrogen generator employing solid and liquid reactants, according to a first embodiment.

The hydrogen generator 14 has a solid containing a second reactant has a concentration gradient that varies along an axis of the solid and reacts with a first liquid reactant applied by a liquid delivery member as described below with reference to FIGS. 2-4. The concentration gradient controls the reaction rate of the first and second reactants to achieve a substantially uniform consumption of the reactant pellet and high liquid reactant flow rates for longer periods of time without having to tightly control the liquid reactant flow across an entire path on the surface of the solid reactant pellet. In the embodiment shown, the axis extends along the length of the solid. However, it should be appreciated that the axis may extend along other directions such as width or depth or other paths.

The hydrogen generator 14 includes a reactant storage area 58, a reaction area 52 and an effluent storage area 74 within a housing 50. The liquid 60 is contained within the reactant storage area 58, and the solid 54 is contained within the reaction area 52. The liquid 60 includes a first reactant, such as a water and acid solution that can be transported to the reaction area 52. The solid 54 includes a second reactant, such as a chemical hydride, and can be in the form of one or more pellets. The effluent storage area 74 includes a filter, which can have one or more filter components, such as three filter components 76, 78 and 80. The reactant storage area 58 is enclosed by an enclosure 59 such as a liquid impermeable bag.

The reaction area 52 can be at least partially enclosed by an enclosure 56. The effluent storage area 74 can be enclosed by an optional enclosure (not shown). Various types of enclosures can be used for the reactant storage area 58, the reaction area 52 and the effluent storage area 74. For example, an enclosure can include internal surfaces of the housing 50, other internal components of the hydrogen generator 14 and/or it can share a common wall or section with one or more other enclosures. All or portions of the enclosures can be flexible, rigid, stationary or moveable, preferably as long as the effluent storage area 74 is in a volume exchanging relationship with at least one of the reactant storage area 58 and the reaction area 52. As shown, the enclosures 59 and 56 enclosing the reactant storage area 58 and the reaction area 52, respectively, are flexible enclosures that can collapse as liquid 60 exits the reactant storage area 58, and effluent exits the reaction area 52. Examples of flexible enclosures include bags, balloons and bellows. It can be advantageous for flexible enclosures to be elastic so they can be stretched when full and tend to contract back to their original size as the contents exit, thereby helping to expel fluids as the hydrogen generator 14 is operated.

During use of the hydrogen generator 14, liquid 60 is transported from the reactant storage area 58 to the reaction area 52 by any suitable means, as described above. For example, the liquid 60 can be transported through a liquid outlet passage 18. If a pump is used, the pump 22 can be within the housing 50, or it can be located externally as in the embodiment shown in FIG. 1. When a pump 22 is used, the liquid 60 can be pumped through the liquid outlet passage 18, such as a liquid outlet connection to the pump. Optional features, such as valves, filters and the like can be incorporated into the liquid outlet connection 18. An external pump 22 can pump the liquid 60 back into the hydrogen generator 14 through a liquid inlet connection 20.

The hydrogen generator 14 includes a liquid delivery member 64 for transporting and dispersing the liquid 60 to the solid 54 within the reaction area 52. The liquid delivery member 64 is connected to inlet 20 such that the liquid 60 from the first reactant storage area 58 is delivered to the reaction area 52. The liquid delivery member 64 includes a first portion 72 and a second liquid distribution portion 75 containing a plurality of openings 90 for delivering the liquid 60 to the reaction area 52. The first portion 72 extends from the inlet 20 to the liquid distribution portion 75. One or more openings 90 may be employed to deliver the liquid 60 to the solid 54 to generate hydrogen. In the embodiment shown, the openings 90 are spaced throughout a length of the tubular liquid delivery portion 75 sufficient to deliver a sufficient amount of liquid 60 over a sufficient area of the solid 54.

Figure 3:
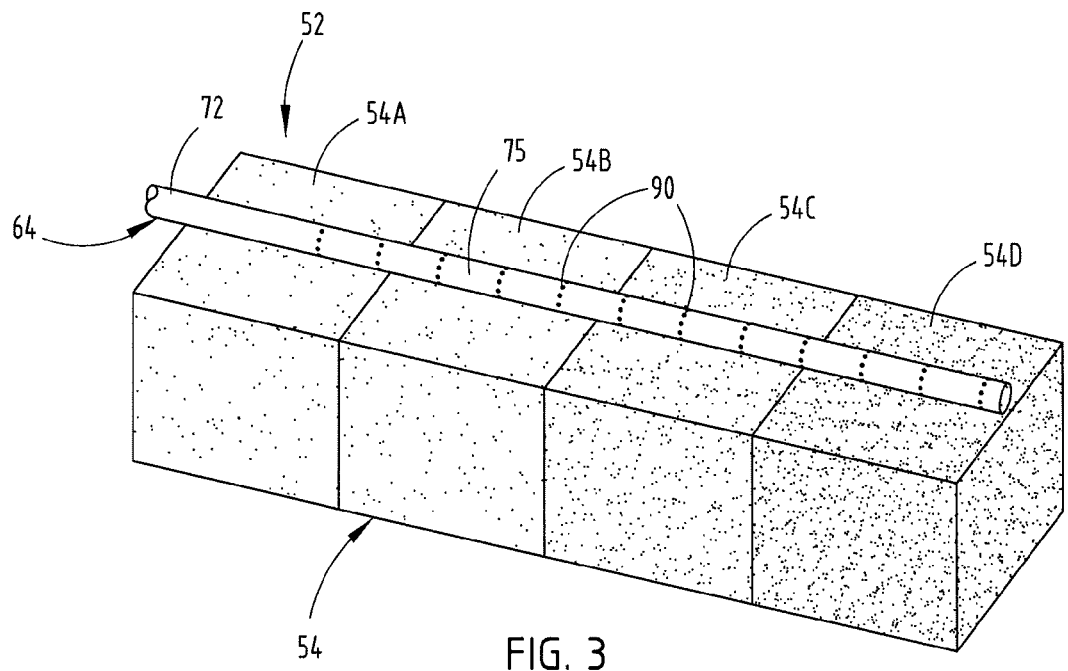
FIG. 3 is a perspective view of an unconsumed solid reactant pellet having a concentration gradient and a liquid delivery member employed in the hydrogen generator.
Figure 4:
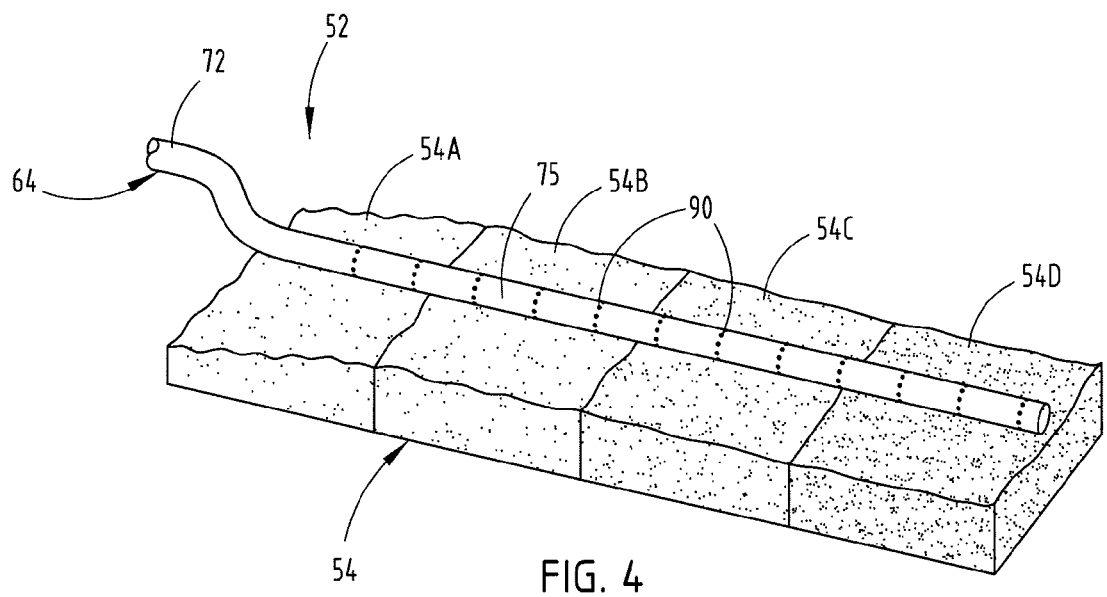
FIG. 4 is a perspective view of the solid reactant pellet partially consumed and the liquid delivery member on top thereof.

A portion of the reaction area 52 is shown in FIGS. 3 and 4 having the solid 54 and the liquid delivery member 64 disposed on a top surface thereof. The enclosure 56 (not shown) may include a polymeric bag or other liquid impermeable container that contains the solid 54 and its reaction with the liquid 60 delivered thereto. An exhaust nozzle or port 62 (not shown) may matingly engage the open end of the enclosure 56 and have an opening for allowing hydrogen and effluent to exit the enclosure 56. The liquid delivery member 64 may be integrally connected to the exhaust nozzle 62, according to one embodiment. This advantageously allows for the exhaust nozzle 62 to be assembled to the enclosure 56 within a single opening, thereby minimizing the assembly thereof. The liquid 60 can flow to the reaction area 52 through a liquid inlet passage, such as a tube connected to the inlet connection 20. Optional features such as valves, filters and the like can be incorporated into the liquid inlet connection 20. The liquid 60 is delivered though the liquid delivery member 64 to disperse the liquid 60 over a large portion of the reaction area 52. The liquid delivery member 64 can include one or more structures that extend into the reaction area 52. The structure(s) can be substantially linear, as shown in FIGS. 2-4, or they can have other shapes.

The liquid delivery member 64 is shown in FIGS. 3 and 4 disposed on top of the solid 54 such that the liquid delivery member 64 contacts or is in close proximity to the solid 54. In FIG. 3, the solid 54 is shown not consumed, and the liquid delivery member 64 lies on top of the solid 54 and has a substantially straight arrangement that is not flexed. As liquid 60 is transported through the liquid delivery member 64, the liquid exits openings 90 and is applied due to liquid flow and gravity and reacts with the second reactant in the solid 54 so as to consume the solid 54 while generating hydrogen. As the second reactant is consumed, the solid 54 erodes such that its shape and size changes and becomes smaller. Hydrogen gas generated in the reaction area 52 exits through the exhaust nozzle and tends to carry with it reaction byproducts as well as some of the unconsumed reactants. In addition, the flow of liquid tends to be greater through the openings 90 at the inlet end rather than the outlet end of the liquid distribution portion 75, particularly when openings 90 have a uniform size. Both of these factors result in more of the liquid 60 on the side of the reaction area 52 closest to the exhaust nozzle, such that the solid closest to the exhaust nozzle is consumed at a greater rate. While the plurality of openings 90 are shown evenly disposed throughout the liquid distribution portion 75 of the liquid delivery member 64, it should be appreciated that the openings 90 may be disposed unevenly throughout the liquid distribution portion 75, according to other embodiments. The solid 54 containing the second reactant is configured having a concentration gradient that varies along an axis of the solid, such as along the length of the solid, generally in a direction aligned with the liquid delivery member. In the embodiment shown, solid 54 includes four portions extending in four segments along the length of the solid 54, namely, first portion 54A, second portion 54B, third portion 54C and fourth portion 54D. Each of portions 54A-54D has a reactant concentration that is different than the other of the portions 54A-54D. In one embodiment, the first portion 54A has a first reactant concentration and the second portion 54B has a second reactant concentration that is greater than the first reactant concentration. The third portion 54C has a third reactant concentration greater than the second reactant concentration. Similarly, the fourth portion 54D has a fourth concentration greater than the third reaction concentration. As liquid reactant flows into the inlet end toward the distal outer outlet end of the liquid distribution portion 75, the liquid flow is less at the outlet end as compared to the inlet end. By employing a concentration gradient that has a lower reactant concentration in the portion 54A near the inlet end which increases towards the highest reactant concentration in the portion 54D near the liquid outlet end of the liquid distribution portion 75, a more uniform consumption of the solid 54 may be achieved which may allow for enhanced flow rates for longer periods of time. As a result, a more uniform consumption and dissipation of the solid 54 and its reactant may be achieved, as shown in FIG. 4. Each of the portions 54A-54D can be individual pellets, or they can be portions of a unitary solid body 54, or the number of portions in the solid body 54 can be varied as desired.

According to one embodiment, the solid employs an acid concentration that varies among different portions 54A-54D so as to achieve the concentration gradient. In one embodiment, the acid concentration varies along a longitudinal axis of the solid 54. As such, each of portions 54A-54D has a different acidity. According to another embodiment, the type of acid employed in each portion 54A-54D may be different such that each portion achieves a different reaction rate to compensate for the variation in liquid reactant flow exiting the liquid delivery member 64. The change in acid may be distinct change from one portion to another or may include a continuous change within each region.

According to another embodiment, the solid employs different catalysts in different portions 54A-54D of the solid. This may include employing a different type and/or amount of catalyst within each of the regions 54A-54D so as to provide the concentration gradient. A higher concentration of catalyst may be used where there is less liquid reactant flow and less catalyst may be used where there is greater liquid reactant flow. The catalyst may be selected to achieve a desired reaction rate.

According to a further embodiment, the solid may employ a hydrophilic material that varies in portions 54A-54D so as to provide the concentration gradient. The hydrophilic material may include additives such as surfactants or wetting agents to control liquid surface tension and reaction product viscosity to facilitate the flow of hydrogen gas and/or effluent or additives such as porous fiber. The selected hydrophilic material may vary based on the rate at which it absorbs or wicks in the liquid. A hydrophilic material having a higher affinity for liquid (e.g., water) could be used where there is less liquid reactant flow and a lower affinity for water when there is more liquid reactant flow.

According to yet another embodiment, the solid may include at least one of density and porosity of the solid that varies within each of regions 54A-54D to provide the concentration gradient. The solid containing the solid reactant may have a density that is greater in one portion compared to the other portions. The density or porosity may vary continuously within each portion or may be distinct changes between each of the portions 54A-54D. The density or porosity of the solid may be higher in regions of the solid where there is higher liquid reactant flow as compared to regions of the solid having less liquid reactant flow.

It should be appreciated that the solid may be configured with other constituents that can be varied to provide a concentration gradient along an axis of the solid, according to other embodiments.

When an internal or external pump 22 as shown in FIG. 1 is used, it can be powered at least initially by an external power source, such as the fuel cell or another battery within a fuel cell system or an electrical appliance or device. If the pump 22 is within the container 50, connection can be made to an external power source through electrical contacts. Alternatively, a battery can be located within the container to at least start the pump 22.

The solid 54 contains a solid reactant that will react with the reactant contained in the liquid in the reactant area 52. The solid 54 can be in a convenient form such as a pellet containing the second reactant and any desired additives. An optional catalyst can be included in or downstream from the reaction area. For example, the catalyst can be on or part of the reaction area enclosure 56, dispersed in the solid 54, or carried into the reaction area as part of the liquid 60.

Referring back to FIG. 2, as the liquid 60 comes in contact with the solid 54, the first and second reactants react to produce hydrogen gas and byproducts. The hydrogen gas flows out of the reaction area 52 and through an effluent passage to an effluent entryway 86, where it enters the effluent storage area 74. The hydrogen gas carries with it effluent that includes byproducts as well as unreacted reactants and other constituents of the solid 54 and liquid 60. Where a reaction area enclosure 56 is used, the effluent exits the reaction area 52 though an opening in the enclosure 56. The opening in the reaction area enclosure 56 can include an exhaust nozzle 62, which can help keep the aperture open. The exhaust nozzle 62 can optionally include a screen to hold large pieces of the solid 54 in the reaction area 52 to improve utilization of the second reactant. The effluent passageway can be a structure such as a tube (not shown) extending between the exhaust nozzle 62 and the effluent entryway 86, or it can be spaces that are present or develop between the exhaust nozzle 62 and the effluent entry 86. Although it is desirable for the majority of the reactants to react within the reaction area 52, unreacted reactants in the effluent can continue to react after exiting the reaction area 52. An optional secondary reaction area (not shown) can be included between the primary reaction area 52 and the effluent storage area 74. Fresh liquid 60 can be transported directly to this secondary reaction area, such as through a second fluid passage (not shown), to react with unreacted second reactant in the effluent from the primary reaction area 52. A catalyst can be disposed within the secondary reaction area.

Hydrogen gas and effluent entering a proximal portion of the effluent storage area 74 through the effluent entryway 86 flows through the filter 76, 78 and 80 toward a distal portion of the effluent storage area 74. As the hydrogen gas and effluent flow through the filter 76, 78 and 80, hydrogen gas is separated from solid particles of the effluent by the filter 76, 78 and 80, which can be a single filter component or multiple filter components, such as the three filter components 76, 78 and 80. As described above, the filter 76, 78 and 80 can have portions and/or filter components of different porosities, preferably increasing in porosity from the proximal portion toward the distal portion of the effluent storage area 74, where the hydrogen gas exits the effluent storage area 74.

The hydrogen gas may be separated from liquids and any remaining solids in the effluent before exiting the hydrogen generator 14 by a hydrogen permeable, liquid impermeable material. The hydrogen gas can exit the hydrogen generator 14 through a hydrogen outlet connection 16. The hydrogen outlet connection 16 can be located near the distal portion of the effluent storage area 74 as shown in FIG. 2, or it can be located elsewhere, such as near the proximal portion of the effluent storage area 74. If the hydrogen outlet connection 16 is not near the distal portion of the effluent storage area 74, the hydrogen gas can flow from the distal portion of the effluent storage area 74 to the hydrogen outlet connection 16 through a hydrogen outlet passage 88, such as a tube, which has a proximal end near the hydrogen outlet connection and a distal end 82 near the distal portion of the effluent storage area 74. The hydrogen gas can enter the hydrogen outlet passage 88 through the distal end 82. The hydrogen permeable, liquid impermeable material can be a component, such as a membrane, plug or filter element, preferably located at or near the distal end 82, or at least a portion of the hydrogen passage 88 can be made of a material that has high hydrogen permeability and low or no liquid permeability. If only a portion of the hydrogen passage 88 is made from a material with high hydrogen, low liquid permeability, that portion is preferably a distal portion to minimize the amount of solids in the effluent that comes in contact with and could clog the material, preventing hydrogen gas from exiting the effluent storage area 74.

If the hydrogen outlet connection 16 is located near the distal portion of the effluent storage area 74, the hydrogen generator 14 can include an optional compartment positioned between the hydrogen outlet connection 16 and the hydrogen permeable, liquid impermeable material. Alternatively, at least a portion of an effluent storage area enclosure (e.g., a flexible bag) near the distal portion of the effluent storage area 74 can be the hydrogen permeable and liquid impermeable material.

As shown, the effluent storage area 74 can be in a volume exchanging relationship with both the reactant storage area 58 and the reaction area 52. As the hydrogen generator 14 is used, reactant composition 60 is transported from the first reactant storage area 58, which becomes smaller, to the reactant area 52, where first and second reactants are consumed as they react to produce hydrogen and byproducts. The hydrogen gas and effluents exit the reaction area 52, which becomes smaller, and enter the effluent storage area 74, which is able to become larger by gaining at least a portion of the quantity of volume lost by the reactant storage area 58 and the reaction area 52. As the effluent storage area 74 becomes larger, the filter or at least one filter component 76, 78 and 80 expands to partially or completely fill the enlarged volume and accommodate the hydrogen gas and effluent. The relative sizes, shapes and locations of the areas 52, 58 and 74 can be varied as described above, as can passageways, connections and the like, as long as the effluent storage area 74 is in a volume exchanging relationship with at least one and preferably all of the reactant storage area 58, and the reaction area 52, and the filter 76, 78 and 80 is initially compressed and expands during operation of the hydrogen generator as the volume of the effluent storage area 74 increases. The locations of other components, such as filter components, fluid connections, passageways, dispersing members, nozzles and the like can also be varied, whether the areas 52, 58, 74 are in the arrangement shown or in another arrangement.

The hydrogen generator 14 can include an optional moveable partition (not shown), between the effluent storage area 74 and adjacent portions of the reactant storage area 58 and the reaction area 52, with the moveable partition able to move toward the reactant storage area 58 and the reaction area 52 as those areas 52 and 58 become smaller and the effluent storage area 74 becomes larger during operation of the hydrogen generator 14, as long as there is an effluent entryway 86 through which effluent can pass into the effluent storage area 74. Such a moveable partition can be used to facilitate compression of the filter components during assembly of the hydrogen generator 14. The hydrogen generator 14 can include other components not shown, as described above.

Figure 5:
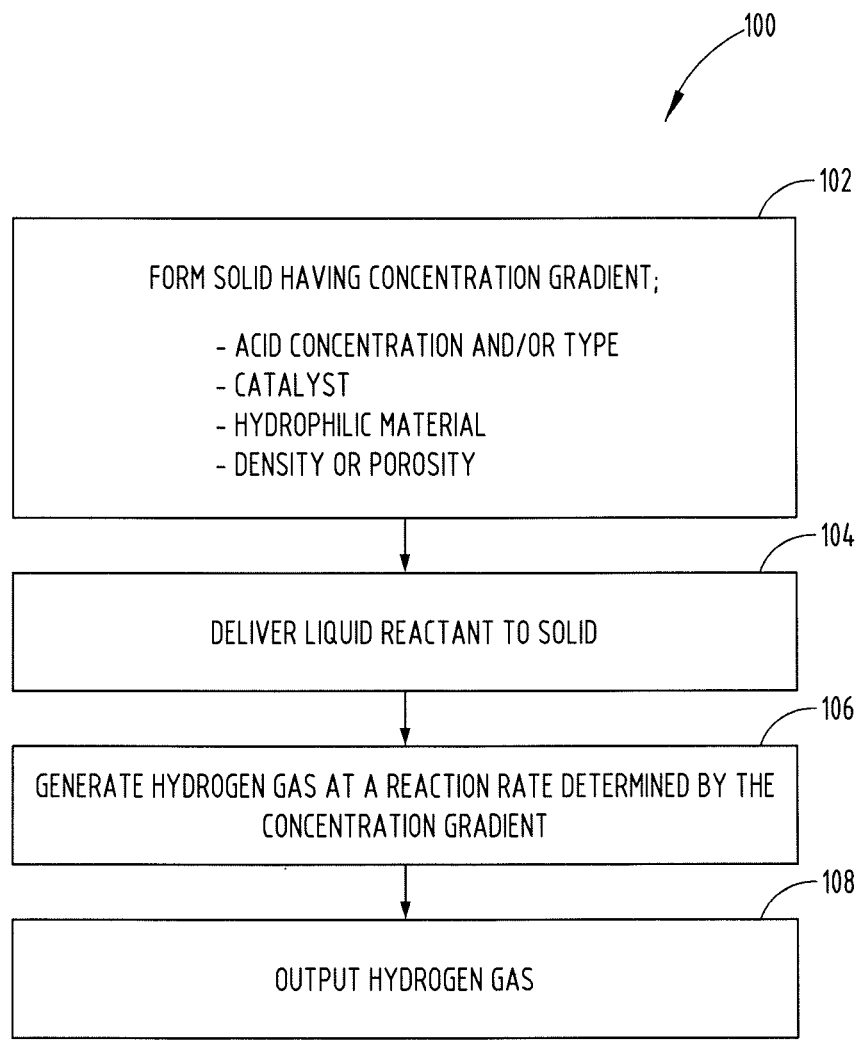
FIG. 5 is a flow diagram illustrating a process of generating hydrogen gas with the hydrogen generator employing a solid reactant having a concentration gradient, according to one embodiment.

Referring to FIG. 5, a process of generating hydrogen gas with the hydrogen generator employing a concentration gradient in the solid is illustrated, according to one embodiment. Process 100 includes step 102 of forming a solid including a solid reactant and having a concentration gradient. The solid may be in the form of a single solid pellet having a varying concentration gradient or a plurality of solid pellets having a concentration gradient. The concentration gradient may be realized with a variation in a reactant concentration according to one embodiment, an acid concentration and/or type according to another embodiment, a catalyst according to yet another embodiment, a hydrophilic material according to a further embodiment, or a density and/or porosity according to yet a further embodiment. The solid reactant pellet(s) may be formed of individual pellets defining separate regions that are assembled, bonded together or otherwise provided in contact or close proximity. The concentration gradient may be distinct variations in the reactant concentration between regions, continuous within each region, or a combination thereof.

Process 100 further includes step 104 of delivering liquid reactant to the solid. This may include delivering a liquid reactant by way of the liquid delivery member to a surface of the solid such that the liquid reactant reacts with the solid reactant. The concentration gradient compensates for the rate of liquid reactant delivery so as to provide a uniform consumption of the solid reactant, despite the potential non-uniform liquid flow. At step 106, process 100 generates hydrogen gas at a reaction rate that is determined by the concentration gradient. The concentration gradient affects the reaction rate within a given region and is configured to provide more uniform consumption of the solid reactant. At step 108 process 100 outputs the hydrogen gas which may be useful for a fuel cell or other hydrogen consuming device.

A variety of materials are suitable for use in a hydrogen generator, including those disclosed above. Materials selected should be resistant to attack by other components with which they may come in contact (such as reactant compositions, catalysts, effluent materials and hydrogen gas) as well as materials from the external environment. The materials and their important properties should also be stable over the expected temperature ranges during storage and use, and over the expected lifetime of the hydrogen generator.

Suitable materials for the housing and internal partitions can include metals, plastics, composites and others. Preferably the material is a rigid material that is able to tolerate expected internal pressures, such as a polycarbonate or a metal such as stainless steel or anodized aluminum. The housing can be a multi-component housing that is closed and sealed to securely hold the components of the hydrogen generator and prevent hydrogen gas from leaking therefrom. Various methods of closing and sealing can be used, including fasteners such as screws, rivets, etc., adhesives, hot melts, ultrasonic bonding, and combinations thereof.

Suitable materials for flexible enclosures can include polypropylene, polyethylene, polyethylene terephthalate and laminates with a layer of metal such as aluminum. If an elastic enclosure is desired, suitable materials include silicone and rubbers.

Suitable materials for tubing, etc., used to transport fluid reactant composition and effluents can include silicone, TYGON® and polytetrafluoroethylene.

Suitable materials for filters and filter components can include foam materials. A foam material can have an open cell structure (an open cell foam) or closed cell structure (a closed cell foam). Generally a major part of the foam filter will have an open cell structure. In some embodiments the filter component or a portion thereof can have a closed cell structure or a skin on one or more surfaces, depending on the desired porosity and permeability to solids, liquids and gases. The filter components can be made from elastomeric foams, preferable with a quick recovery (low compression set/high recovery). The elastomer may be a resilient cured, cross-linked or vulcanized elastomer, for example. Examples of suitable elastomeric materials include one or more of: a polyurethane elastomer, a polyethylene, a polychloroprene (neoprene), a polybutadiene, a chloroisobutylene isoprene, a chlorosulphonated polyethylene, an epichlorohydrin, an ethylene propylene, an ethylene propylene diene monomer, an ethylene vinyl acetate, a hydrogenated nitrile butadiene, a polyisoprene, an isoprene, an isoprene butylene, a butadiene acrylonitrile, a styrene butadiene, a fluoroelastomer, a silicone, and derivatives and combinations thereof.

Other materials that can be used for the filter components include reticulated materials such as reticulated polyesters (e.g., polyethylene terephthalate), polyethylene, polyurethane, polyimide, melamine, nylon, fiberglass, polyester wool and acrylic yarn. As disclosed above, the filter does not necessarily have to be made of a material that can expand by itself after being compressed if another means of expanding the filter is provided.

Suitable materials for a liquid delivery or dispersing member can include a liquid impermeable material, such as tubular or other hollow components made from materials such as silicone rubber, TYGON® and polytetrafluoroethylene, polyvinylidene fluoride (PVDF) and fluorinated ethylenepropylene (FEP), with holes or slits formed therein; a liquid permeable member made from a material such as cotton, a nylon, an acrylic, a polyester, ePTFE, or a fitted glass that can allow the fluid reactant composition to pass through or that can wick the liquid reactant composition; or a combination, such as a hollow liquid impermeable material with holes or slits therein and wrapped in, surrounded by or coated with a material that can wick the liquid reactant composition.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A hydrogen generator comprising:
a container;
a liquid reactant storage area configured to contain a liquid comprising a first reactant;
a reaction area within the container;
a solid containing a second reactant within the reaction area and comprising a concentration gradient that varies along an axis of the solid; and
a liquid delivery member for delivering the liquid to the solid in the reaction area to generate hydrogen, wherein the concentration gradient controls a reaction rate of the first and second reactants,
wherein the liquid delivery member comprises a liquid distribution portion having a plurality of liquid outlets, and
wherein the liquid distribution portion has first and second ends, and a liquid flow outlet greater at the first end than the second end, wherein the concentration gradient has a reactant concentration that is lowest at the first end and higher at the second end.

2. The hydrogen generator of claim 1, wherein the solid comprises an acid having an acid concentration that varies along the axis of the solid to provide the concentration gradient.

3. The hydrogen generator of claim 1, wherein the solid comprises a catalyst, wherein the catalyst varies along the axis of the solid to provide the concentration gradient.

4. The hydrogen generator of claim 1, wherein the solid comprises a hydrophilic material that varies along the axis of the solid to provide the concentration gradient.

5. The hydrogen generator of claim 1, wherein the solid has at least one of density or porosity that varies along the axis of the solid to provide the concentration gradient.

6. The hydrogen generator of claim 1, wherein the solid comprises a first portion having a first reactant concentration and a second portion comprising a second reactant concentration, and wherein the first reactant concentration is different than the second reactant concentration.

7. The hydrogen generator of claim 6, wherein the first portion is closer to an inlet of the liquid delivery member and the second portion is closer to a distal outlet of the liquid delivery member.

8. The hydrogen generator of claim 7 further comprising a third portion having a third reactant concentration and a fourth portion having a fourth reactant concentration.

9. The hydrogen generator of claim 1, wherein the axis is along a length of the solid.

10. The hydrogen generator of claim 1, wherein the solid is a solid body comprising one or more pellets.

11. The hydrogen generator of claim 1, wherein the second reactant comprises sodium borohydride and the first reactant includes water.

12. The hydrogen generator of claim 1, wherein the liquid reactant storage area is contained within the container.

13. The hydrogen generator of claim 1 further comprising a hydrogen outlet for outputting the generated hydrogen.

* * * * *